(12) United States Patent
Kravitz et al.

(10) Patent No.: US 8,706,595 B2
(45) Date of Patent: Apr. 22, 2014

(54) FLEXIBLE PREMIUM INCOME ANNUITY SYSTEM AND METHOD

(75) Inventors: Jodi L. Kravitz, New York, NY (US); William Formon, Rye, NY (US)

(73) Assignee: New York Life Insurance Company, New York, NY (US)

( * ) Notice: Subject to any disclaimer, the term of this patent is extended or adjusted under 35 U.S.C. 154(b) by 1259 days.

(21) Appl. No.: 11/874,374

(22) Filed: Oct. 18, 2007

(65) Prior Publication Data

US 2009/0106167 A1 Apr. 23, 2009

(51) Int. Cl.
*G06Q 40/00* (2012.01)
*G06Q 40/06* (2012.01)
*G06Q 40/08* (2012.01)

(52) U.S. Cl.
CPC ............. *G06Q 40/00* (2013.01); *G06Q 40/06* (2013.01); *G06Q 40/08* (2013.01)
USPC ............................. 705/36 R; 705/4; 705/35

(58) Field of Classification Search
CPC ........ G06Q 40/00; G06Q 40/06; G06Q 40/08
USPC .............................................. 705/35, 4, 36 R
See application file for complete search history.

(56) References Cited

U.S. PATENT DOCUMENTS

| | | | |
|---|---|---|---|
| 5,893,071 A * | 4/1999 | Cooperstein | 705/4 |
| 6,611,815 B1 * | 8/2003 | Lewis et al. | 705/36 R |
| 7,991,676 B1 * | 8/2011 | Schwartz et al. | 705/36 R |
| 2002/0188540 A1 * | 12/2002 | Fay et al. | 705/36 |
| 2003/0083972 A1 * | 5/2003 | Williams | 705/36 |
| 2005/0060251 A1 * | 3/2005 | Schwartz et al. | 705/35 |
| 2006/0206398 A1 * | 9/2006 | Coughlin | 705/35 |
| 2007/0100727 A1 * | 5/2007 | Multer et al. | 705/36 R |
| 2008/0052133 A1 * | 2/2008 | Kravirtz et al. | 705/4 |
| 2008/0189223 A1 * | 8/2008 | Baiye | 705/36 R |
| 2008/0281742 A1 * | 11/2008 | Lyons et al. | 705/35 |
| 2009/0030823 A1 * | 1/2009 | Tatro et al. | 705/35 |

OTHER PUBLICATIONS

Toolson, R. B. (1991). Tax-advantaged investing: Comparing variable annuities and. Journal of Accountancy, 171(5), 71. Retrieved Nov. 21, 2013.*

* cited by examiner

*Primary Examiner* — Kito R Robinson
(74) *Attorney, Agent, or Firm* — Meister Seelig & Fein, LLP (57) ABSTRACT

A computerized method and system for providing a flexible income annuity includes inputting a plurality of premium payments for the income annuity from an investor, the flexible premium payments being received on different dates. The computerized method and system further includes computationally aggregating income benefits from the one or more investment vehicles of the income annuity where the income benefits are associated with premium payments received on different dates. The method and system further includes calculating an income payment based the aggregated income benefits and outputting the income payments to a payee on one or more selected disbursement dates. Therefore, the investor is provided the flexibility to make premium payments for the income annuity on varying dates.

46 Claims, 4 Drawing Sheets

FLEXIBLE PREMIUM INCOME ANNUITY SYSTEM AND METHOD

RELATED APPLICATIONS

The present application relates to a co-pending, commonly owned U.S. patent application, Ser. No. 11/367,647, entitled METHOD AND SYSTEM FOR PROVIDING VALUE OF ANTICIPATED POLICY BENEFITS, co-pending, commonly owned U.S. patent application Ser. No. 10/191,737, entitled METHODS AND SYSTEMS FOR PROVIDING AN INSURANCE POLICY WITH AN INFLATION PROTECTION OPTION, and co-pending, commonly owned U.S. patent application, Ser. No. 11/391,876, entitled METHOD AND SYSTEM FOR PROVIDING A CUSTOMIZABLE INSURANCE POLICY, all of which are herein incorporated by reference in their entirety.

COPYRIGHT NOTICE

A portion of the disclosure of this patent document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

This invention relates to the field of insurance and other benefits, and more particularly, to methods and systems for providing income annuities with flexible features, including flexible premium payments.

BACKGROUND OF THE INVENTION

An income annuity is a well-known financial vehicle used to pay a person a certain sum of money in a series of distributions made at regular intervals, such as monthly or annually, based on a given amount of principal from an initial contribution of assets. Income annuities are available in many forms. The distributions may be made for a predetermined definite period, as in an annuity certain, or for as long as the person lives, as in a life annuity. Payments under a life annuity may terminate on the annuitant's death, as in a straight life annuity, or may continue to a beneficiary for a specified period after the annuitant's death, as in a life annuity with period certain. Alternatively, a life annuity may be based on two lives jointly, as in a joint and last-survivor annuity in which payments continue to be made to the survivor for the remainder of his or her life, or may provide a beneficiary a lump sum payment upon the death of the annuitant. The payments under an income annuity may be set to begin one payment interval after purchase of the annuity, as in an immediate income annuity, or after a specified amount of time, as in a deferred income annuity.

Individual Retirement Accounts ("IRAs") and tax-deferred retirement plans are widely used as tax-deferred investment vehicles to provide retirees with income after their retirement. Upon retirement, a retiree may have access to one or more such tax-deferred investment vehicles as well as other liquid assets that have accumulated over time. Because the assets in these investment vehicles may be an important source of income for the remainder of his or her life, it is extremely important for the retiree to make optimal use of them. Clearly, it is vital for the retiree to not consume the assets too quickly and instead retain sufficient funds on which to live thereafter. Conversely, many retirees also find it undesirable to consume assets too slowly, thus making sacrifices in their standards of living, and then die owning substantial assets that often pass to their children who may not need them.

In addition, retirees often consider it highly important to keep their retirement assets substantially liquid, i.e., to be able to withdraw as cash or to convert to cash all or a large portion of the assets on relatively short notice, such as in the event of a medical emergency or family celebration. Therefore, it is important that the assets not be locked up in a financial vehicle that makes them inaccessible or illiquid.

One existing offering which offers some measure of liquidity is discussed in U.S. Pat. No. 5,933,815 entitled "COMPUTERIZED METHOD AND SYSTEM FOR PROVIDING GUARANTEED LIFETIME INCOME WITH LIQUIDITY." This annuity offering addresses problems with short-term liquidity issues for annuities, by using a guaranteed financial vehicle for a defined period to allow the annuity owner to withdraw funds. This annuity offering allows flexibility in the selection of investment vehicles to accommodate varying income distributions.

There are other existing annuity offering options available, such as a flexible premium income annuity in the tax-qualified market. This annuity offering provides for flexible premium payments but is offered only as an Individual Retirement Annuity in the tax-qualified market. These systems are limited in their product features and payment options by the tax code provisions governing tax-qualified annuities. For example, the tax code does not allow tax-qualified annuity products to offer an increasing payment unless the total expected payments at policy issue are greater than the premium.

Another available annuity offering includes a fixed deferred income annuity that allows for flexible premiums, but do not include investment options relating to variable deferred income products or variable deferred accumulation annuities. This available annuity is restricted by delayed payouts on the investments. Investors have the ability to make multiple premium payments, but do not have the ability to receive an immediate pay-out by virtue of the investment being in a deferred income annuity.

Another available annuity product is a flexible premium accumulation annuity, which offers a feature similar to a guaranteed minimum income benefit, but is not a deferred income annuity. Rather, this annuity is akin to a savings account or other type of basic investment vehicle. Unlike an income annuity, this annuity has a cash value (i.e., the investor retains ownership of the invested funds) and does not leverage mortality risk pooling, which allows an insurer to pay income benefits to policy owners who live beyond life expectancy partly with premium paid by policy owners who predeceased their life expectancy.

With existing annuity offerings, problems still exist regarding the financial contributions for establishing the income annuity. Present systems operate by receiving an initial single contribution. This limits the income annuity owner by requiring available funds at the establishment of the annuity. As a person matures, their financial conditions can change, such as being able to afford greater annuity benefits at a later point in time. Additionally, the person may not have the funds readily available at the time of the inception of the income annuity, but may still wish to invest in an income annuity that would allow additional contributions at a later time. Under existing income annuity programs and offerings, the person is precluded from acquiring such annuity above the level of funds directly on hand to pay the initial premium and/or is precluded from making additional contributions at a later time. If additional funds became available, the investor would have to purchase another annuity instead of being able to have the greater convenience and simplicity of merely supplementing an existing annuity. Therefore, there exists a need for an income annuity allowing for flexible premium payments.

SUMMARY OF THE INVENTION

In some embodiments, the present invention overcomes the above-noted and other shortcomings of the prior art by providing a novel and improved computerized method and system for an income annuity including flexible premium payments. Generally, the computerized method and system for providing a flexible premium income annuity includes receiving an input of a plurality of premium payments for the income annuity from an investor, the flexible premium payments being received on different dates. The method and system further includes computationally aggregating income annuity benefits where the income benefits are associated with premium payments received on different dates. The income benefits provided by the income annuity may arise from one or more investment vehicles, which may be non-tax qualified, or tax qualified, such as a fixed, or "General" account; a variable, or "Separate" account that includes other investment vehicles, or "Sub-accounts" (e.g., mutual funds); or both General and Separate accounts. Moreover, the income benefits are based on unrestricted times of disbursements, where the beneficiary may withdraw funds, i.e. take a disbursement, at any time without any time-based restrictions. The method and system further includes generating an income payment based on the aggregated income benefits and outputting or disbursing the income payments to a payee on one or more selected disbursement dates.

BRIEF DESCRIPTION OF THE DRAWINGS

The invention is illustrated in the figures of the accompanying drawings which are meant to be exemplary and not limiting, in which like references are intended to refer to like or corresponding parts throughout, and in which.

DETAILED DESCRIPTION OF THE PREFERRED EMBODIMENTS

A flexible premium income annuity, according to the embodiments of the present invention, overcomes the limitations of existing systems by allowing the investor to make premium payments at times beyond, and in different amounts than, the initial premium payment at the origination of the policy. As used herein, the term premium payments include payments made by an investor where the funds of the premium payment are included in the assets of the annuity and used to further the income annuity by being used for investment purposes. It is understood that any number of a variety of investment-type vehicles may be used to generate the income for the annuity, where the annuity underwriter, an insurance agent, a financial advisor, the investor, or any other party may select these investment vehicles. As used herein, the term "investor" refers to the person or entity that provides the premium payments and serves as the policy owner, with all the contractual rights and decision-making powers thereof. A "payee" is a person or entity who receives the income annuity payments or other benefits, which are calculated based on the measuring life of an "annuitant." It is typical that the investor, payee and annuitant are the same person, but it is also recognized that these parties may be different, where the investor purchases and funds the annuity for the benefit of the payee based on the measuring life of the annuitant. It is also recognized that the definitions of the parties may change due to the nature of the annuity, such as in the event an annuity extends beyond the death of the annuitant.

Figure 1:
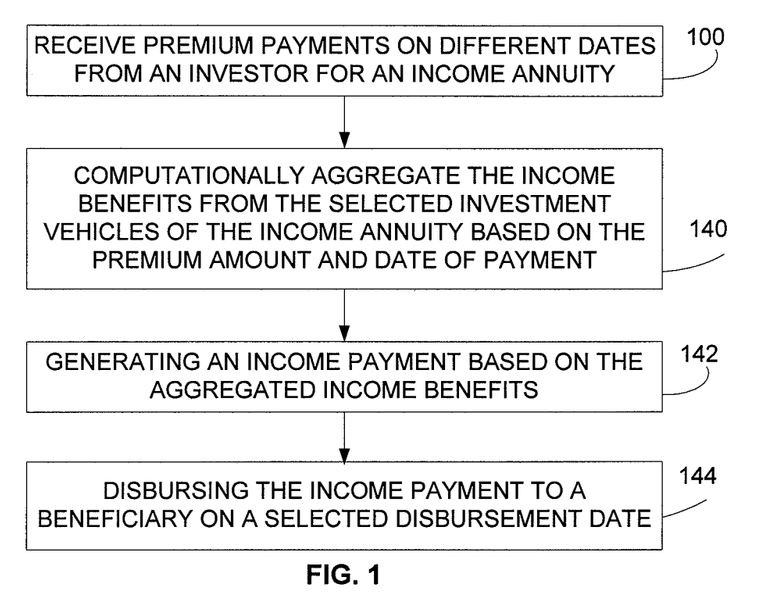
FIG. 1 illustrates a flowchart of the steps of one embodiment of a method for providing a flexible premium income annuity.

FIG. 1 illustrates a flowchart of one embodiment of a computerized method for providing an income annuity. The flowchart represents a generalized description of one embodiment, wherein FIGS. 2-4 and the discussion below provide further aspects of the embodiment of FIG. 1 and additional embodiments thereto.

In this embodiment, the computerized method begins, step 100, by receiving an input of premium payments on different dates from an investor for an income annuity. The receipt of input may be performed using a computerized algorithm wherein a user, upon a secure log-in and the association of a corresponding account, can perform a funds transfer. The computerized algorithm further includes processing the funds transfer and applying the income funds, i.e. premium payment, to the account and hence the income annuity.

Figure 2:
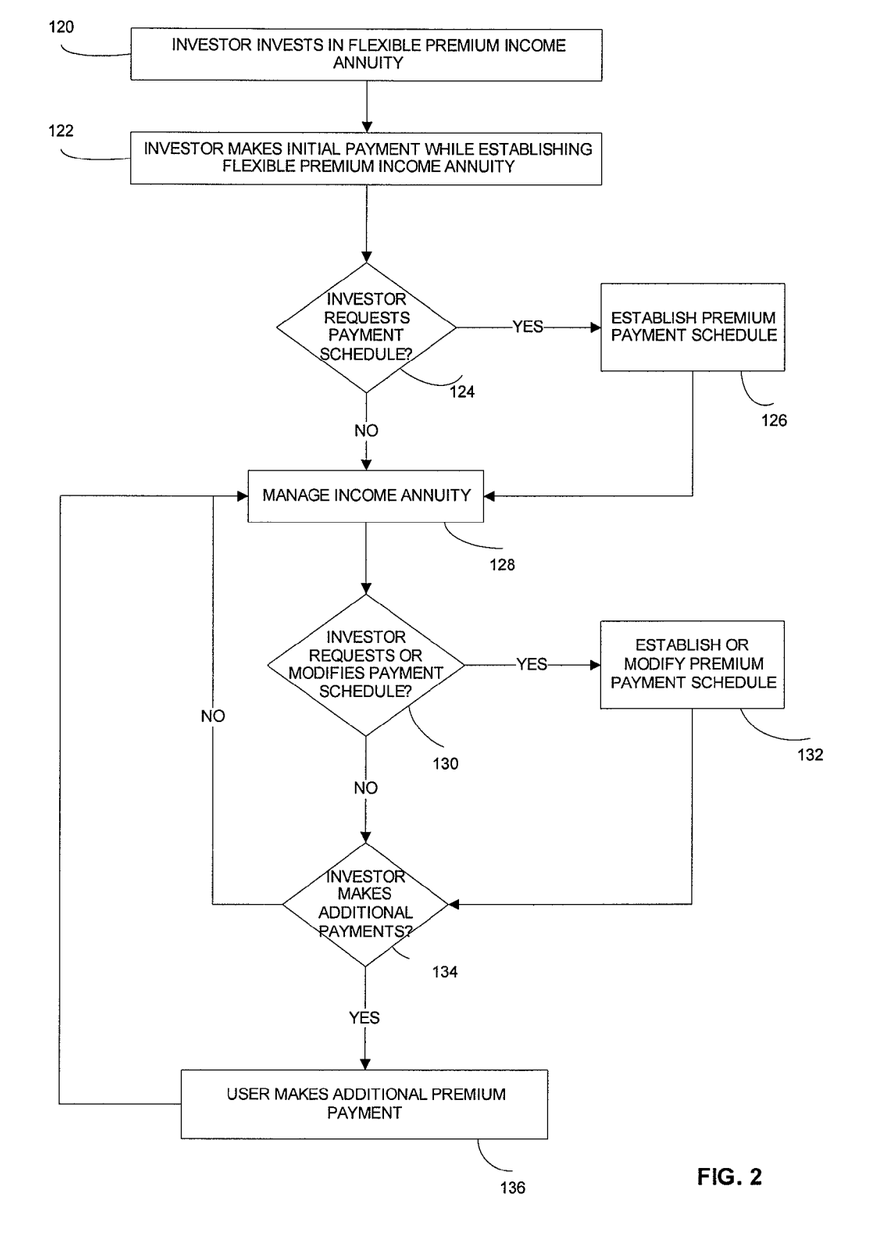
FIG. 2 illustrates a flowchart of the steps of an aspect of one embodiment of a method for providing a flexible premium income annuity.

In the context of generating an income annuity, an investor may be given the option of numerous premium payment options. FIG. 2 illustrates a flowchart of the sample payment options that may be used with the flexible premium income annuity. In a first step 120, the investor (or any other suitable party) invests in a flexible premium income annuity. As designated in step 122, investing in this annuity includes making an initial premium payment, consistent with standard techniques for issuing single premium income annuities. It is recognized that in step 120, there may be additional information or procedures implemented for issuing the flexible premium income annuity. Or in another embodiment, the establishment of this account, steps 120 and 122, may be entirely consistent with standard techniques for issuing single premium income annuities.

The computerized establishment of the income annuity with flexible premium payments includes the designation of proper income benefits. For example, if the income annuity has a Separate account, the investor may select investment vehicles, or Sub-accounts, carrying a higher risk with a potential for a larger return with earlier-in-time payments and later premium payments may be designated for more risk-averse investments.

Unlike a single premium income annuity, a flexible premium income annuity allows the investor to make additional premium payments during the life of the policy. If additional payments are made, the additional premium payments may be another one-time payment, periodic payments or even sporadic payments, wherein periodic payments are new payments on a regular interval and sporadic payments are payments made at irregular intervals.

When periodic payments are anticipated, a payment schedule may be established. If, at the decision block of step 124 in FIG. 2, the investor requests the establishment of a payment schedule for periodic premiums, then a payment schedule may be established, step 126, and the method proceeds to step 128, which includes managing the annuity. If, at the decision block of step 124, the investor does not request the establishment of a payment schedule for periodic premiums, then the method proceeds to step 128, which includes managing the annuity.

At any point after the establishment of the annuity, the investor may request a payment schedule or modify a previously established payment schedule. If, at the decision point at step 130, the investor requests the establishment of a payment schedule or the modification of a previously established payment schedule, then a payment schedule may be established or modified, step 132, and the method proceeds to the decision block of step 134. If, at the decision point at step 130, the investor does not request the establishment of a payment schedule or the modification of a previously established payment schedule, then the method proceeds to the decision block of step 134.

Regardless of the investor's decision at decision block of step 130, the investor or any other suitable person or entity may make additional premium payments at any time. If the investor elects to make an additional premium payment at the decision block of 134, then the payment may be made at step 136, with the method thereafter reverting to step 128, which includes managing the annuity. If the investor does not elect to make an additional payment at step 134, then the process reverts to step 128, which includes managing the annuity.

In the flowchart of FIG. 2, the reversion of the method to step 128, which includes managing the annuity, may be performed after an additional payment is received at step 136, or if the answer to the inquiry in step 134 is in the negative. The flexible premium income annuity allows the investor to make additional payments at later points in time, therefore an iterative flow proceeds from step 128, whereby during the management of the annuity, additional payments, step 136, may be received. In one embodiment, an investor may establish the flexible premium income annuity in steps 120 and 122 unsure if additional payments of step 136 will be made.

The timing and amount of the payment of premiums allows for varying degrees of flexibility in managing the income annuity. For example, in one embodiment each income benefit stream purchased under the policy can be independent of other income streams (if any) purchased under the contract and thus, each of the following factors may be calculated independently: (1) the modal income amount, based on the pricing in effect at the time of each premium payment; (2) any changes to the income benefit stream requested by the investor (e.g., annual increases to mitigate the impact of inflation); (3) any amounts that might be available for withdrawal; (4) the statutory reserve; and (5) the sales commission. Other embodiments could have varying degrees of dependence among the various income streams purchased. As discussed later, income streams could have the same or different payment modes, payment options, and product features. One possible benefit of using a flexible premium annuity is that it is possible that the owner can get a more attractive payout rate on subsequent premium deposits than he would be able to get if he put the money into a new single premium contract, because the insurance company can consider the cumulative premium when determining the premium band. It is possible that the cumulative premium amount will correspond to a higher premium band than the new premium amount, which could enable the owner to get a higher crediting rate than he otherwise could. Another possible benefit of using a flexible premium annuity is the opportunity to benefit from dollar cost averaging.

Referring back to the flowchart of FIG. 1, the next step, after the income annuity has been established and premium payments have been received, step 140 includes computationally aggregating the income benefits based on the premium amount, the General and/or Separate account investment vehicles to which the premium has been allocated, and the date of payment, among other factors, wherein the computation is electronically performed. As described in further detail below, the income annuity designates one or more investment vehicles (i.e., a General account, a Separate account with Sub-accounts, or both) and the premium payments are allocated thereto. In one embodiment, the investment vehicles may be non-tax qualified investment vehicles, thereby offering a larger variety of investment options. Based on the premium amount allocated to each of the investment vehicles, they thereupon generate corresponding amounts of income benefits. Each investment vehicle may generate a different amount of return on investment that is payable to the payee and this return is dependent on not only the performance of the investment vehicle, but also the date at which the premium(s) were received, among other factors. The step 140 includes computationally aggregating the different investment returns for the various investment vehicles. The step may be electronically performed using a computerized algorithm. A first step in the algorithm is to define the amounts for the various investment vehicles at a designated point in time. This step may include special electronic calculations specific to the different investment vehicles, as recognized by one skilled in the art. A second step is then to combine or otherwise aggregate the dollar amounts from the different vehicles, where aggregation may include the summation or other calculations to provide a cumulative total of the returns for the different investment vehicles.

Another factor of the income benefit is that the flexible premium income annuity does not include restrictions regarding disbursements thereby greatly increasing the investor's flexibility. As described above, prior financial vehicles include restrictions on when an owner or beneficiary may take a withdraw, such as for example investment funds being tied up for a period of time for a specific investment vehicle that does not allow early withdrawal, therefore the money is not readily available for withdrawal. The present flexible premium income annuity may allow unrestricted disbursements, whereby the funds are thus readily available and may be invested in different investment vehicles or invested on different terms.

By way of example, an investor may establish a flexible premium income annuity with a first premium payment of $100,000. The investor may be age 70 and purchase a life with 10 year certain plan, generating a monthly income of $713.47. The investor may then elect to make a second premium payment of $20,000 at age 72 with a life with 10 year certain plan generating a monthly income of $146.67. The investor may then elect to made a third premium payment of $25,000 at age 75 with a life with 5 year certain plan, generating a monthly income of $210.29. This flexible premium income annuity may thereby generate the following income stream: $713.47 per month from ages 70$\frac{1}{12}$ to 72; $860.14 per month from ages 72$\frac{1}{12}$ to 75; and $1,061.43 per month from age 75$\frac{1}{12}$ until death of annuitant with guaranteed payments after age 75; $1061.43 per month until age 80, and $146.67 per month from age 80 to age 82.

In this embodiment, step 142 includes electronically generating an income payment based on the aggregated income benefits. This step may include simply adding together the various income benefits. For example, income benefits purchased at, or subsequent to, policy issue, would be added to other income benefits payable even though such other benefits may have been purchased at a different time and price. Other embodiments may include additional calculations, such as offsetting for overhead costs or other associated fees. In addition, other embodiments may not aggregate income benefits for disbursement on the same periodic payment date (e.g., the first calendar day of every month.) For example, income benefits from three different income streams might be paid on the $5^{th}$, $10^{th}$ and $15^{th}$ calendar day of every month.

In the embodiment in which income benefits are aggregated, a next step 144 includes electronically outputting, or disbursing, the income payment to a beneficiary on a selected disbursement date. This step may be performed by a computer algorithm, wherein a first step is determining a disbursement amount and having the transfer information, for example a checking account, for funds to be electronically transferred. A second step may include confirmation of disbursement information and the actual transfer of the funds to the designated recipient source. A third step may be the receipt of a confirmation of the electronic transfer and the auditing or settling of the account to confirm balance information to account for the disbursed funds. A final step may include the funds being made available for usage by the recipient.

The income annuity may provide lifetime or periodic income payments. The payment date for each income stream is typically designated at the outset of the generation of the annuity and/or income stream.

Figure 3:
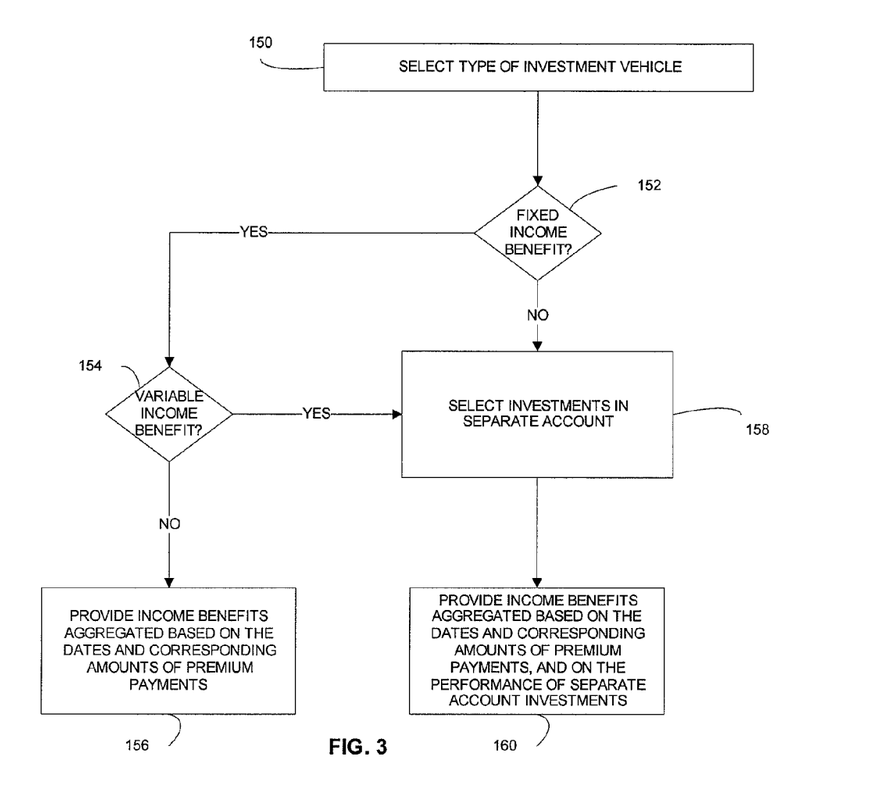
FIG. 3 illustrates a flowchart of the steps of an aspect of one embodiment of a method for providing a flexible premium income annuity.

FIG. 3 illustrates a flowchart including steps for one embodiment relating to the electronic establishment or adjustment of the income annuity. In this embodiment, the investor allocates the premium to one or more types of investment vehicles (i.e., a General account, a Separate account, or both), step 150. The selection includes the ability for flexible premium payments, which may thereby offer a greater degree of flexibility in type of investment vehicles. A first option, step 152, the investor may allocate premium to a fixed, or General, account, without also allocating premium to investments in a Separate Account, step 154. If premium is allocated to a General account without also allocating premium to investments in a Separate Account, the flexible premium income annuity thereupon provides fixed income benefits aggregated based on, among other factors, the dates and corresponding amounts of premium payments, as described above with regards to FIG. 1, step 156. In another embodiment, the income benefit provided by the General account would be based on an interest rate that would be set for a particular guarantee period and would be reset at the start of each subsequent guarantee period.

Regardless of the answer to the inquiry of step 152, whether a fixed income benefit is selected, the investor may select to allocate the premium to a variable, or Separate, account, step 154 and step 158. If the premium is allocated to a Separate account, the flexible premium income annuity provides income benefits aggregated based on, among other factors, the dates and corresponding amounts of premium payments, and on the performance of the investment vehicle, step 160. In additional embodiments with a variable income benefit, the allocation of premium to a Separate account may be contractually defined, with the balance of the premium payment allocated to the General account. In another embodiment with a variable income benefit, allocation of premium to the Separate account and/or the General account is adjustable rather than contractually defined. In this embodiment, the investor may be allowed to allocate any percentage of each premium payment, subject to any contractual restrictions, to the Separate account of the annuity, with the balance going to the General account of the annuity. Through such allocation, the investor may adjust potential variability of the income benefit. A guaranteed minimum income could be the income generated by the funds allocated to the fixed portion or an income amount that is some factor (e.g., 50%) of the initial income payment.

In other embodiments, not specifically illustrated herein, the investor may also electronically designate an income start date. In one embodiment, the flexible premium income annuity may require that the payment of income benefits begin within one year of a policy's issue date and/or the date of the premium payment giving rise to the income benefit.

In another embodiment, the flexible premium income annuity may require that the payment of income benefits begin after the first year of a policy's issue date and/or the date of the premium payment giving rise to the income benefits. Similar to the above described embodiment of income benefit payments within the first year, these income benefit payments may be associated with premiums paid at the time of policy issue or at anytime thereafter.

In yet another embodiment, the income annuity would offer the investor the flexibility to choose any income start date for income benefits generated by a particular premium payment.

As described above, the flexible premium income annuity, through allowing the investor to make flexible premium payments, thereby includes an added level of investor flexibility in the income annuity policy because the timing and value of the payment of income benefits is directly related to the time and amount of the flexible premium payments.

Figure 4:
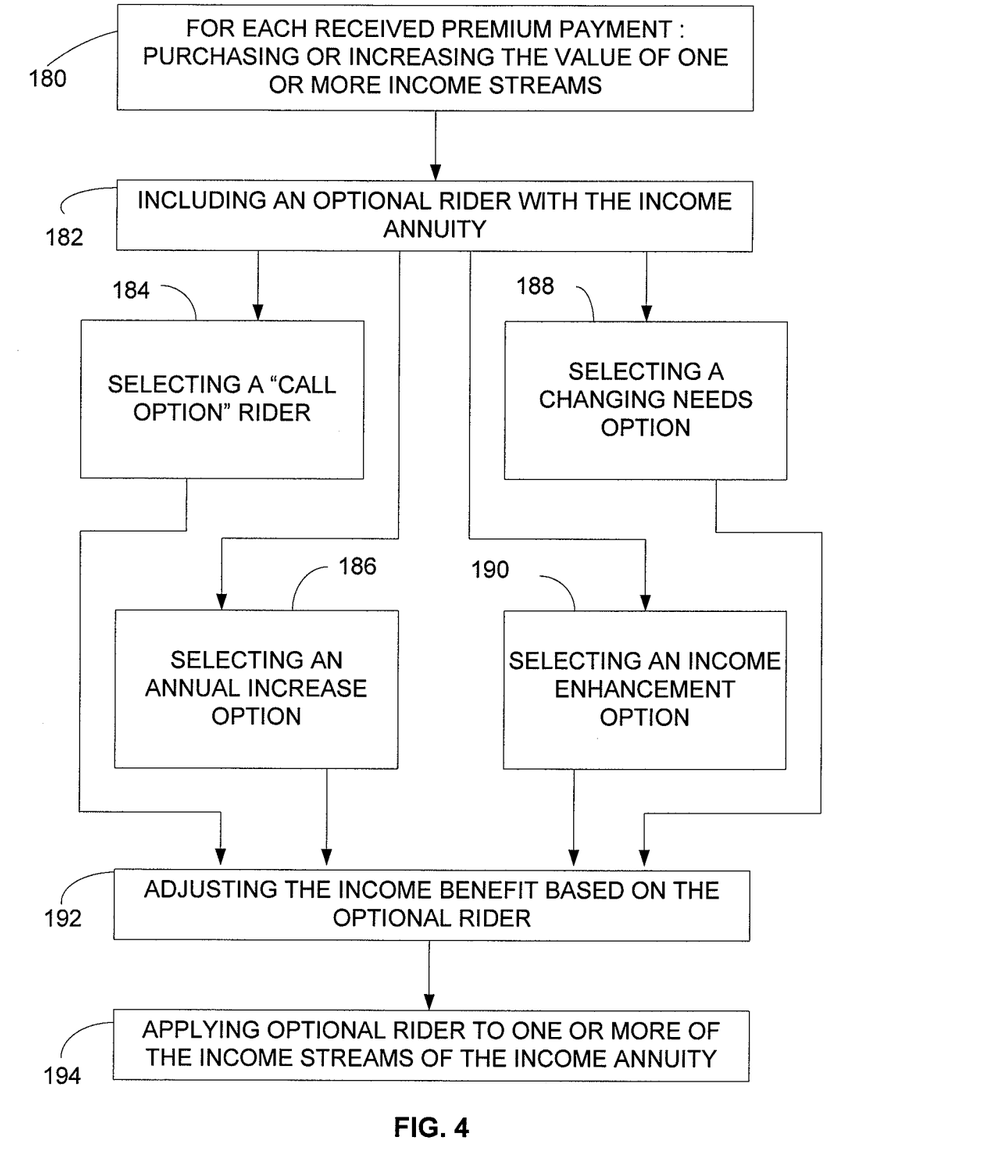
FIG. 4 illustrates a flowchart of the steps of an aspect of one embodiment of a method for providing a flexible premium income annuity.

FIG. 4 illustrates a flowchart of the steps of one embodiment of the computerized steps relating to the flexible premium income annuity. In one embodiment, all premium payments are similarly allocated to one or more existing investment vehicles to produce income benefits that are governed by one or more existing terms, such as payment mode, monthly payment date and payout options. Alternatively, the investor may make changes from premium payment to premium payment with regard to the allocation of premium to investment vehicles and the terms of the income benefits, such as the payment mode, monthly payment date and payout options. In this flowchart, the first step, step 180, is that for each received premium payment, the income annuity includes purchasing or increasing the value of one or more income streams. The purchasing of a new income stream, or the increasing of the value of one or more income streams, may involve additional premium payments and allocating those premiums to one or more investment vehicles (e.g. General and/or Separate accounts). In this embodiment, the various income streams purchased with the multiple premium payments may vary from one to another in material ways, including for example different payment periods, staggered end dates and monthly payment dates.

In this embodiment, the investor, in step 182, may include an optional rider with the income annuity. This step may include the optional rider being offered to the investor by the entity providing the income annuity.

As noted in FIG. 4, numerous optional riders may be presented to and/or selected by the investor. A first such optional rider is a "call option" rider, the selection of which is shown in step 184. As its name implies, a "call option" rider functions similar to a financial call option, which provides investors with a right, but not an obligation, to buy an agreed upon quantity of a particular commodity or financial instrument from the seller of the option at a certain time for a certain price. The "call option" rider may be beneficial to investors who wish to ladder premium payments using the flexible premium income annuity, but are concerned that future credit rates might be lower. The "call option" rider may be triggered if a benchmark index is at least a certain number of percentage points (e.g. 200 basis points) lower on a particular future date than it was when the consumer purchased the rider. Once triggered, the "call option" rider would enable purchasers to buy, on a particular future date, a pre-determined amount of income benefit based on the higher locked-in credit rate. A policy underwriter may then use all or part of the premium for the "call option" rider to purchase financial derivatives, options, and/or other investments that would pay off if, on the relevant future date, the benchmark index were at a predetermined number of basis points lower than it was when the consumer purchased the rider. Additionally, the "call option" rider could be purchased at the time of the purchase of the annuity, at a later date in time, or a combination of both.

A second optional rider is an annual increase option, the selection of which is shown in step 186. This rider, as described in commonly owned co-pending patent application Ser. No. 10/191,737, entitled "METHODS AND SYSTEMS FOR PROVIDING AN INSURANCE POLICY WITH AN INFLATION PROTECTION OPTION," may be included as an optional rider with the flexible premium income annuity. This rider provides for an annual increase in the annuity income payment amount as a hedge against inflation. The inclusion of this optional rider may include computer-based premium computations, such as the computational formulae described in the above-noted and incorporated related application.

A third optional rider is a changing needs option, the selection of which is shown in step 188. This rider, as described in commonly owned co-pending patent application Ser. No. 11/391,876 entitled "METHOD AND SYSTEM FOR PROVIDING A CUSTOMIZABLE INSURANCE POLICY," may be included as an optional rider with the flexible premium income annuity. This rider allows, with certain limitations, for an investor to schedule, at the time of purchase, a one-time future increase or decrease in the income payment amounts. The inclusion of this optional rider may include computer-based calculations based on formulae described in the above-noted and incorporated related application.

A fourth optional rider is an income enhancement option, the selection of which is shown in step 190. This rider, as described in commonly owned co pending patent application Ser. No. 11/163,779 entitled "Two-tier Single Premium Immediate Annuity—Method and System for Providing Flexible Income, Liquidity Options and Permanent Legacy Benefits for Annuities," may be included as an optional rider with the flexible premium income annuity. This rider allows, with certain limitations, a consumer who is considering locking in lifetime income in a low interest rate environment to enjoy an automatic increase in benefits if a benchmark index is at least a certain number of percentage points (e.g., two hundred basis points) higher at a particular future time, for example on the fifth anniversary of the purchase of rider. Additionally, the income enhancement option rider could be purchased at the time of the purchase of the annuity, at a later date in time, or a combination of both. The inclusion of this optional rider may include computer based calculations relating to fully life contingent annuity calculations, monthly future income payments for a life annuity including a lump sum death benefit option calculation, and a single life annuity calculation based on the formulae described in the above-noted and incorporated related application.

It is recognized that there exists other available optional riders that can be utilized to supplement or otherwise enhance the flexible premium income annuity. Any other suitable optional rider may be incorporated with the flexible premium income annuity policy and the above-noted embodiments are not meant to be restrictive list of optional riders.

Regardless of the selected rider, such as for example any of the four exemplary riders (steps 184-190), the computerized method further includes, step 192 adjusting the income benefit based on the optional rider. Thereby, the method includes, step 194, applying the optional rider to one or more of the income streams of the income annuity. The application of the optional rider to one or more income streams may include a computerized algorithm including a first step of selecting one or more of the various income streams. A second step is electronically applying the optional rider to the selected income stream(s), which may include applying additional funds and/or terms and restrictions of the optional rider. Thereby, the final step in this algorithm may be updating accounting information stored in a memory location to indicate the inclusion of the optional rider at the updated income stream(s). The optional rider(s) may be applied to a single income stream or may in another embodiment be applied to all income streams in the annuity.

Figure 5:
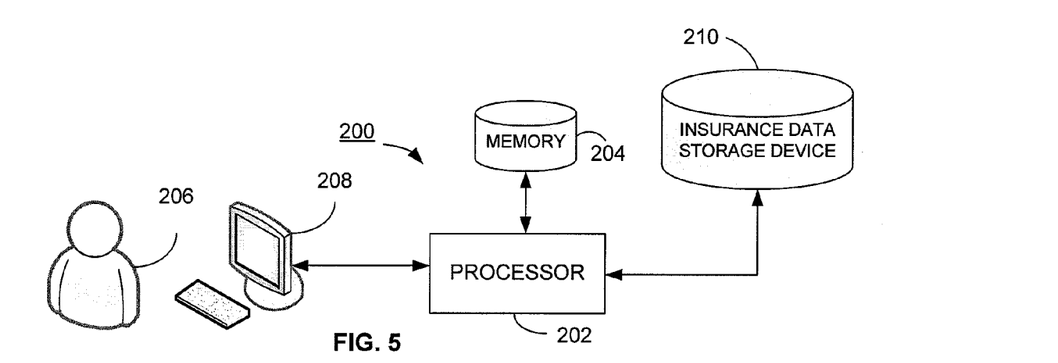
FIG. 5 illustrates a processing system operative to provide a flexible premium income annuity.

FIG. 5 illustrates one embodiment of a system 200 that provides for the flexible premium income annuity policy as described above. The income annuity is provided through a computer program product including executable instructions stored on a computer readable medium. By way of example, a processor 202 may perform executable operations based on instructions received from the memory device 204. Through the operations, the processor may be operative to administer and track the flexible premium income annuity in a variety of ways. For example, the processor may be used for managing the investment vehicles, tracking premium payments, aggregating income benefits and facilitating payments of the income benefits to designated beneficiaries.

The system 200 includes the processor 202 and memory device 204, where the processor 202 is accessible by a user 206 operating a terminal device 208. It is also understood that the processor 202 and related components may be disposed directly within the computer 208.

In one embodiment, the system 200 further includes the insurance data storage device 210, operative to store information usable for conducting and maintaining the flexible premium income annuity. For example, the device 210 may include information on the investment vehicles, premium payments and other data usable for providing the flexible premium income annuity described herein.

As illustrated in FIG. 5, the user 206 may be an employee of an underwriter, an insurance agent, or other person operative to manage the income annuity as generated and run on the processor 202. The processor 202 is operative to perform the computing operations described above, including the steps of the flowcharts of FIGS. 1 and 4. Through this processing system, investors can enjoy the benefits of an income annuity with the additional benefits of having flexibility in the timing of the payment of annuity premiums.

While the invention has been described and illustrated in connection with preferred embodiments, many variations and modifications as are to be evident to those of skill in the art may be made without departing from the spirit and scope of the invention, and the invention is thus not to be limited to the precise details of methodology or construction set forth above, as such variations and modifications are intended to be included within the scope of the invention. For example, the collection of the information from and presentation of offers to customers may be done electronically or via the Internet using the systems and methods described herein. Alternatively, or in addition, the systems and methods of the present invention can be used by agents in the field, who will be orally presenting the results and calculations performed using the claimed inventions. In addition, in some embodiments, an issuer or its agents may set up a website specifically directed to customers interested in flexible premium policies, using the systems and methods disclosed herein. It is to be understood by those of ordinary skill in the art that the various data processing tasks described herein may be implemented in a wide variety of ways, many of which are known and many more of which are doubtless to be hereafter developed. For example, a wide variety of computer programs and languages are now known, and are likely to be developed, which are suitable for storing, accessing, and processing data, as well as for performing, processing, and using actuarial forecasts and other analyses as disclosed herein.

What is claimed is:

1. A computerized method for providing a flexible income annuity comprising:
    electronically inputting a plurality of premium payments for the income annuity from an investor, each of the premium payments being received on variable dates and in variable amounts selected by the investor after origination of the income annuity;
    electronically computationally aggregating, using a processing device, income benefits from one or more designated investment vehicles associated with at least one of the plurality of premium payments received on the variable dates and variable amounts selected by the investor after origination of the income annuity, the income benefits based at least in part on disbursements options selected by the investor after origination of the income annuity;
    electronically calculating, using a processing device, an income payment based on the aggregated income benefits; and
    outputting the income payment to a payee on a selected disbursement date.

2. The computerized method of claim 1, wherein the one or more designated investment vehicles include at least one of fixed income benefit vehicles and variable income benefit vehicles.

3. The computerized method of claim 2, wherein the fixed income benefit vehicles provide income benefits based on the dates and corresponding amounts of premium payments as determined by the aggregation.

4. The computerized method of claim 2, wherein the variable income benefit generates income payments based on both a pricing at the date of the premium payment and a performance of one or more investment vehicles.

5. The computerized method of claim 4, wherein the percentage of each premium payment that is allocated to a General account and to a Separate account, respectively, is contractually defined.

6. The computerized method of claim 4, wherein the percentage of each premium payment that is allocated to the General account and the Separate account, respectively, may be determined by the investor.

7. The computerized method of claim 6 further comprising:
    inputting an allocation of premium to a General account, a Separate account, or both, from the investor; and
    allocating the premium payment to a General account, a Separate account, or both, according to the investor's allocation.

8. The computerized method of claim 1 further comprising:
    inputting an income start date; and
    outputting the income payments to the payee based on at least the income start date.

9. The computerized method of claim 8, wherein the income start date may be one of: within a first year, after the first year of the policy's issue date, and the date of a premium payment giving rise to the income benefit.

10. The computerized method of claim 1, wherein each of the plurality of premium payments is used for at least one of: purchasing or incrementing a value of: one or more of a plurality of incomes streams defined within the income annuity.

11. The computerized method of claim 10 wherein the different income streams may include similar investment vehicles have varying terms.

12. The computerized method of claim 10 further comprising:
    including one or more optional riders with the income annuity; and
    calculating the income benefit based on at least the one or more optional riders.

13. The computerized method of claim 12, wherein the optional rider is a call option rider allowing the investor an option to purchase, at a future specified date, a predetermined amount of annuity income benefits based on at least a higher credit rate if a benchmark index is a predetermined number of percentage points lower on a future date than it was on the rider's purchase date.

14. The computerized method of claim 13 wherein the optional rider is purchased at least one of: the purchase of the annuity; and at a later point in time.

15. The computerized method of claim 12, wherein the optional rider is an annual increase option rider that provides a hedge against inflation.

16. The computerized method of claim 12, wherein the optional rider is a changing needs option rider that allows the investor to adjust income payment amounts.

17. The computerized method of claim 12, wherein the optional rider is an income enhancement option rider that allows the investor an increase in benefits if a benchmark index is a predetermined number of percentage points higher on a future date than it was on the rider's purchase date.

18. The computerized method of claim 17 wherein the optional rider is purchased at least one of: the purchase of the annuity; and at a later point in time.

19. The computerized method of claim 12, wherein the optional rider applies to the income streams as determined by the investor.

20. The computerized method of claim 14, wherein the optional rider applies to all income streams defined within the income annuity.

21. The method of claim 1, wherein the premium payments are received on sporadic dates.

22. A computer program product for use in a computer system programmed to executes program steps recorded on one or more non-transitory computer readable media to perform a method for providing a flexible income annuity, the computer program product comprising:
    one or more computer readable media; and
    one or more computer programs of computer readable instructions executable by the computer system to perform the method steps comprising:
        electronically inputting a plurality of premium payments for the income annuity from an investor, each of the premium payments being received on variable dates and in variable amounts selected by the investor after origination of the income annuity;

electronically computationally aggregating, using a processing device, income benefits from one or more designated investment vehicles associated with at least one of the plurality of premium payments received on the variable dates and variable amounts selected by the investor after origination of the income annuity, the income benefits based at least in part on disbursements options selected by the investor after origination of the income annuity;

electronically calculating, using a processing device, an income payment based on at least the aggregated income benefits; and outputting the income payment to a payee on a selected disbursement date.

23. The computer program product of claim 22, wherein the designated investment vehicles include at least one of fixed income benefit vehicles and variable income benefit vehicles.

24. The computer program product of claim 23, wherein the fixed income benefit vehicles provide income benefits based on at least dates and corresponding amounts of premium payments as determined by the aggregation.

25. The computer program product of claim 23, wherein the variable income benefit generates income payments based on at least both a pricing at the date of the premium payment and a performance of the investment vehicles.

26. The computer program product of claim 25, wherein the percentage of premium allocated to a General account and a Separate account, respectively, is contractually defined.

27. The computer program product of claim 25, wherein the percentage of premium allocated to a General account and a Separate account, respectively, may be specified by the investor.

28. The computer program product of claim 27, wherein the one or more computer programs of computer readable instructions executable by the computer system performs a method step of
inputting an allocation of premium to a General account, a Separate account, or both, from the investor; and
allocating the premium payment to a General account, a Separate account, or both, according to the investor's allocation.

29. The computer program product of claim 22, wherein the one or more computer programs of computer readable instructions executable by the computer system performs a method step of
inputting an income start date; and
outputting the income payments to the payee based on at least the income start date.

30. The computer program product of claim 29, wherein the income start date may be one of: within a first year and after the first year of the premium payment.

31. The computer program product of claim 30, wherein each of the plurality of premium payments is used for at least one of: purchasing or incrementing a value of: one or more of a plurality of incomes streams defined within the income annuity.

32. The computer program product of claim 31, wherein the different income streams include similar investment vehicles having the same or varying terms.

33. The computer program product of claim 31, wherein the one or more computer programs of computer readable instructions executable by the computer system performs a method step of
including an optional rider with the income annuity; and
adjusting the income benefit based on at least the optional rider.

34. The computer program product of claim 33, wherein the optional rider is a call option rider allowing the investor an option to purchase, at a future specified date, a predetermined amount of annuity income benefits based on at least a higher credit rate if a benchmark index is a predetermined number of percentage points lower on a future date than it was on the rider's purchase date.

35. The computer program product of claim 34, wherein the optional rider is purchased at least one of: the purchase of the annuity; and at a later point in time.

36. The computer program product of claim 33, wherein the optional rider is an annual increase option rider that provides a hedge against inflation.

37. The computer program product of claim 33, wherein the optional rider is a changing needs option rider that allows the investor to adjust income payment amounts.

38. The computer program product of claim 33, wherein the optional rider is an income enhancement option rider that allows the investor an increase in benefits if a benchmark index is a predetermined number of percentage points higher on a future date than it was on the rider's purchase date.

39. The computer program product of claim 38, wherein the optional rider is purchased at least one of: the purchase of the annuity; and at a later point in time.

40. The computer program product of claim 33, wherein the optional rider applies to the income streams as determined by the investor.

41. The computer program product of claim 33, wherein the optional rider applies to all income streams defined within the income annuity.

42. The computer program product of claim 22, wherein the premium payments are received on sporadic dates.

43. A computerized method for providing a flexible income annuity comprising:
electronically inputting a plurality of premium payments for the income annuity from an investor, each of the premium payments being received on variable dates and in variable amounts selected by the investor after origination of the income annuity;
electronically determining, using a processing device, income benefits from one or more designated investment vehicles associated with one or more of the plurality of premium payments received on the variable dates and variable amounts selected by the investor after origination of the income annuity, the income benefits based at least in part on disbursement options selected by the investor after origination of the income annuity;
electronically calculating, using a processing device, one or more income payments based on the determined income benefits; and
outputting one or more income payments to a payee on a selected disbursement date.

44. The method of claim 43, wherein the inputting of a plurality of premium payments further comprises inputting, for one or more of the plurality of premium payments, an election of the investor to associate said one or more of the plurality of premium payments with a designated investment vehicle distinct from other one or more designated investment vehicles associated with other of the plurality of premium payments.

45. The method of claim 43, wherein the disbursement options are selected by the investor at the time of each premium payment.

46. The method of claim 43, wherein the premium payments are received on sporadic dates.

* * * * *